US009382737B2

(12) United States Patent
Wei

(10) Patent No.: US 9,382,737 B2
(45) Date of Patent: Jul. 5, 2016

(54) EASY CLEANING GUIDING ASSEMBLY

(71) Applicant: FOSHAN IDEAL CO., LTD., Foshan, Guangdong (CN)

(72) Inventor: Wuxiang Wei, Guangdong (CN)

(73) Assignee: FOSHAN IDEAL CO., LTD., Guangdong (CN)

( * ) Notice: Subject to any disclaimer, the term of this patent is extended or adjusted under 35 U.S.C. 154(b) by 136 days.

(21) Appl. No.: 13/798,194

(22) Filed: Mar. 13, 2013

(65) Prior Publication Data

US 2014/0115824 A1 May 1, 2014

(30) Foreign Application Priority Data

Nov. 1, 2012 (CN) ...................... 2012 2 0570371 U

(51) Int. Cl.

*B60J 7/02* (2006.01)
*E05D 15/06* (2006.01)
*A47K 3/34* (2006.01)

(52) U.S. Cl.

CPC ............... *E05D 15/0656* (2013.01); *A47K 3/34* (2013.01); *E05Y 2600/502* (2013.01); *E05Y 2900/114* (2013.01); *Y10T 16/361* (2015.01)

(58) Field of Classification Search

CPC ............ E05D 15/0656; E05D 15/0604; Y10T 16/361; A47K 3/34; E05Y 2600/502; E05Y 2900/114

See application file for complete search history.

(56) References Cited

U.S. PATENT DOCUMENTS

| | | | | | |
|---|---|---|---|---|---|
| 1,601,473 | A | * | 9/1926 | Gilroy | 16/90 |
| 2,949,626 | A | * | 8/1960 | Blackmer | 16/90 |
| 2,978,757 | A | * | 4/1961 | Ammerman | 49/449 |
| 3,205,529 | A | * | 9/1965 | Vintan | 16/90 |
| 3,454,979 | A | * | 7/1969 | Harbertson | 16/90 |
| 3,493,990 | A | * | 2/1970 | Winn | 16/90 |
| 4,455,709 | A | * | 6/1984 | Zanini | 16/90 |
| 5,671,501 | A | * | 9/1997 | Laramie | 16/96 R |
| 5,675,936 | A | * | 10/1997 | Kurth et al. | 49/404 |

FOREIGN PATENT DOCUMENTS

| | | | | |
|---|---|---|---|---|
| DE | 3800445 A1 | * | 7/1989 | A47K 3/22 |

* cited by examiner

*Primary Examiner* — Robert J Sandy
*Assistant Examiner* — Matthew Sullivan
(74) *Attorney, Agent, or Firm* — Nixon Peabody LLP; Jeffrey L. Costellia

(57) ABSTRACT

An easy cleaning guiding assembly is provided comprising a clamping base provided with an opening and a clamping position, a guiding block being rotatably connected with the clamping base and provided with a clamping element. When the guiding assembly is in use, the guiding block is fixed on the clamping base by engagement of the clamping element in the clamping position, and a guiding channel is formed by the guiding block and the clamping base. The cleaning of the shower door would be very easy, and the operation and mounting is very convenient.

5 Claims, 5 Drawing Sheets

EASY CLEANING GUIDING ASSEMBLY

CROSS-REFERENCE TO RELATED APPLICATIONS

The present application claims the benefit of Chinese utility model application No. 201220570371.X filed on 1 Nov. 2012, the disclosure of which is incorporated herein by reference.

FIELD OF THE INVENTION

The present invention relates to the field of bathroom device technology and the field of shower sliding door technology, and in particular, to an easy cleaning guiding assembly used for sliding shower doors.

BACKGROUND OF THE INVENTION

Generally, most of the shower doors used for bathrooms or bathtubs slides on a rail track by a guiding device. Most of the guiding devices is consisted of a sliding wheel and a fixing device for retaining the sliding wheel on the shower door. The sliding wheel extends into the rail track of the bathroom or bathtub, facilitating the guided sliding of the shower door. The glass guide clip of the conventional shower sliding door is fixed, therefore when cleaning the bathroom, the glass has to be disassembled from the rail track so as to be disconnected with the guide device, which leads to a very inconvenient operation.

U.S. Pat. No. 4,228,560 disclosed a lower guide component mounted on bottom of a shower door assembly, wherein the shower door assembly, capable of swinging, is mounted on a frame. The guide component can be locked up or released by a pivot pin and a hooked slot. While this structure makes it extremely easy to clean up the accumulated dirt and soap, the structure of this component is too complicated.

U.S. Pat. No. 4,769,949 disclosed a free-floating guiding assembly mounted on a door frame, wherein the guiding assembly slides on a sliding slot. Special rail track structure is needed in this assembly, and the hidden slot is hard to clean.

Chinese patent No. CN 1,219,114 A disclosed a removable guiding assembly which is retained in or released from a rail track of a door panel by a release mechanism composed of a button-activated spring clip. It is a spring disassembling structure, which is complicated and easy to lose effectiveness, making its service life very short.

SUMMARY OF THE INVENTION

An objective of the present invention is to provide an easy cleaning guiding assembly which has a simple structure and is easy to clean, so as to overcome disadvantages of the prior art.

To achieve this, an easy cleaning guiding assembly is provided which comprises a clamping base, wherein the clamping base is provided with an opening and a clamping position. The guiding assembly also comprises a guiding block, wherein the guiding block is rotatably connected with the opening by a connecting structure and the guiding block is provided with a clamping element. When the guiding assembly is in use, the guiding block is fixed on the clamping base by the engagement of the clamping element and the clamping position, and a guiding channel is formed by the guiding block and the clamping base.

The clamping base may further be provided with a clamping slot for receiving a panel of glass door. The clamping base is provided with an opening which is rotatably connected with a guiding block. As the clamping base is provided with a clamping position and the guiding block is provided with a clamping element, when the guiding block rotates and forms a guiding channel with the clamping base, allowing passing through of another panel of glass door. When cleaning the bathroom, it is only necessary to push the clamping element apart from the clamping position, which makes the guiding block extensible and thus the glass can be taken out. Therefore the cleaning can be very easy, the operation and mounting is very convenient.

In one implement, pin holes are provided on both sides of the opening of the clamping base, and connecting pin holes are provided on the guiding block. The guiding block is rotatably connected with the clamping base by a pin penetrating through the pin holes and the connecting pin holes. The pin connection of the guiding block and the opening of the clamping base facilitates mounting, release and usage of the assembly, making the assembly more practical.

In another implement, the guiding block comprises a rotating block and a fixing block connected with the rotating block. The connecting pin holes are provided on the rotating block for rotatable connection of the rotating block and the clamping base, and the rotating block further has a obstructing element capable of abutting against the clamping base. The clamping element is provided on the fixing block, and the fixing block is fixed by the engagement of the clamping element and the clamping position of the clamping base. The guiding block can be consisted of a rotating block and a fixing block which are connected with each other, making the combination of the guiding block more flexible, also making the guiding block easy to extend and assemble.

The rotating block can be connected with the fixing block in many ways. For example, in one implement, extension parts are extended out from both sides of the rotating block, a step is provided on the fixing block, and the rotating block is connected with the fixing block by a flexible element. When the guiding assembly is in use, the fixing block is rotated to a position in parallel with the rotating block, with the step abutting against the extension parts, the obstructing element abutting against the clamping base, and the clamping element engaging with the clamping position.

In another implement, second connecting pin holes are provided on the rotating block, third connecting pin holes are provided on the fixing block, the fixing block is rotatably connected with the rotating block by a second pin penetrating through the second connecting pin holes and the third connecting pin holes. When the guiding assembly is in use, the fixing block is rotated to a position in parallel with the rotating block, with the obstructing element abutting against the clamping base, and the clamping element engaging with the clamping position.

Either way can be used, provided that the rotating block and the fixing block form a guiding block stably retained on the clamping base, such that a guiding channel can be formed for a movable glass to slide through. The obstructing element can prevent the rotating block from excess rotating, so as to form a stable guiding channel.

In one implement, the clamping base comprises a base and a housing, with a screw hole and the opening provided on the base, and the clamping slot provided on the housing. The base is provided with a guiding rail, and the housing is provided with a sliding slot. When the sliding slot slides into the guiding rail, the housing is connected with the base and covers the screw hole. To use the assembly, the base can be fixed on the floor by a screw, and then the sliding slot of the housing can slide inside along the guiding rail of the base. After mounting, the housing covers the screw hole and prevents the screw from rusting.

In another implement, the base is integrally formed with the housing. In this case, only a nut cap is needed for covering the screw.

In one implement, the clamping element has an arched contour and the clamping position has a concave smooth surface, for achieving smooth connection therebetween.

Compared to conventional technologies, the easy cleaning guiding assembly of the present invention has a simple structure and when the present invention is in use, a glass can be fixed by the clamping slot of the clamping base. In the meantime, the clamping base is provided with an opening which is rotatably connected with a guiding block. As the clamping base is provided with a clamping position and the guiding block is provided with a clamping element, when the guiding block rotates and forms a guiding channel with the clamping base, the clamping element can be engaged with the clamping position, allowing a movable glass slide on the guiding channel. When cleaning the bathroom, it is only necessary to push the clamping element apart from the clamping position, which makes the guiding block extensible and thus the glass can be taken out. Therefore the cleaning can be very easy, the operation and mounting is very convenient.

BRIEF DESCRIPTION OF THE DRAWINGS

Further advantages and details of the present invention emerge from the example embodiments described below, which do not limit the invention in any way, and from the drawings, in which.

Figure 1:
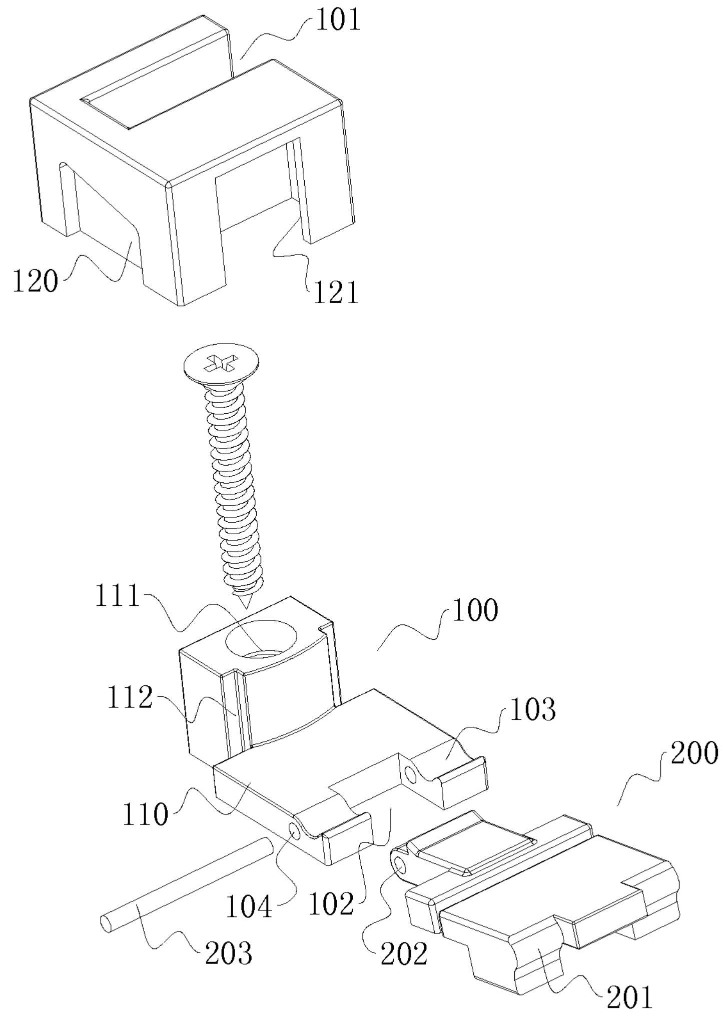
FIG. 1 is an exploded view of example 1 of the present invention.

Elements that are irrelevant to the spirit of the present invention are omitted for clarity.

DETAILED DESCRIPTION OF THE INVENTION

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" include any and all combinations of one or more of the associated listed items. It will be further understood that the terms "comprises" "comprising" "includes" and/or "including" when used herein, specify the presence of stated features, integers, steps, operations, elements, and/or components, but do not preclude the presence or addition of one or more other features, integers, steps, operations, elements, components, and/or groups thereof.

EXAMPLE 1

Referring to FIGS. 1 to 4, an easy cleaning guiding assembly is shown which comprises a clamping base 100 having a clamping slot 101, wherein the clamping base 100 is provided with an opening 102 and a clamping position 103. The guiding assembly also comprises a guiding block 200, wherein the guiding block 200 is rotatably connected with the clamping base 100 by a connecting structure, and the guiding block 200 is provided with a clamping element 201. When the guiding assembly is in use, the guiding block 200 is fixed on the clamping base 100 by the engagement of the clamping element 201 in the clamping position 103, and a guiding channel 300 is formed by the guiding block 200 and the clamping base 100.

In the present example, the clamping element 201 has an arched contour and the clamping position 103 has a concave smooth surface, for achieving smooth connection therebetween.

As shown in FIG. 1, in the present example, pin holes 104 are provided on both sides of the opening 102 of the clamping base 100, and connecting pin holes 202 are provided on the guiding block 200. The guiding block 200 is rotatably connected with the opening 102 by a pin 203 penetrating through the pin holes 104 and the connecting pin holes 202. Particularly, the guiding block 200 comprises a rotating block 210 and a fixing block 220 overlapping connected with the rotating block 210. The connecting pin holes 202 are provided on the rotating block 210 for rotatable connection of the rotating block 210 and the opening 102. The rotating block 210 also has a obstructing element 211 capable of engaging with the clamping base 201. The clamping element 201 is provided on the fixing block 220, and the fixing block 220 can be fixed by the engagement of the clamping element 201 and the clamping position 103 of the clamping base. The guiding block 200 can be consisted of a rotating block 210 and a fixing block 220 which are connected with each other, making the combination of the guiding block 200 more flexible, also making the guiding block easy to extend and assemble.

Figure 2:
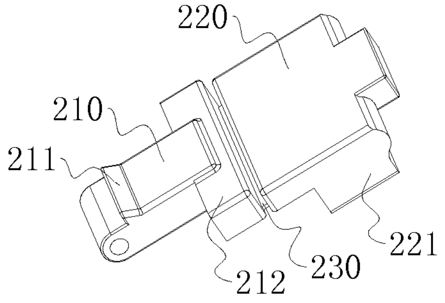
FIG. 2 is a perspective view of a guiding block of example 1.
Figure 3:
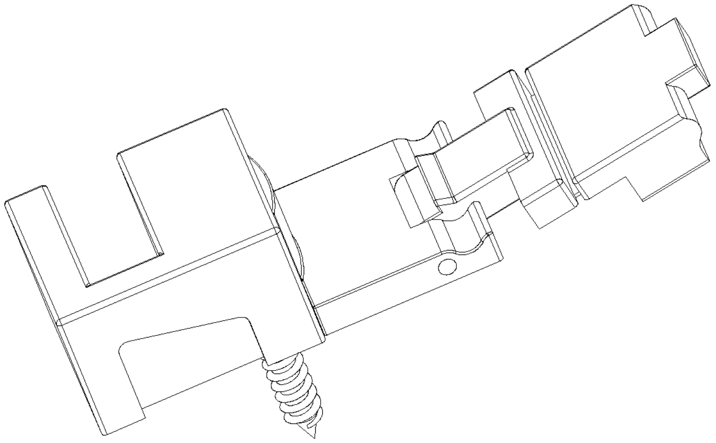
FIG. 3 is an assembly view of example 1.
Figure 4:
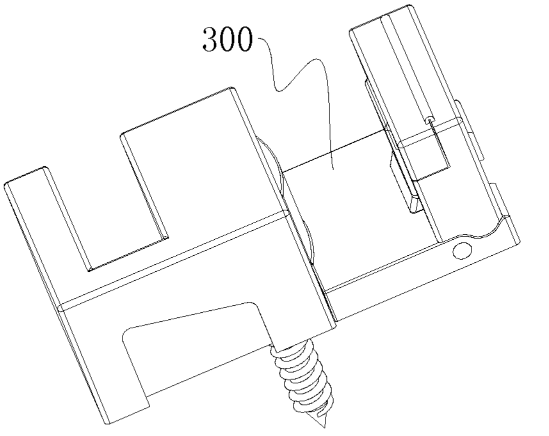
FIG. 4 is a using state view of example 1.

The rotating block 210 can be connected with the fixing block 220 in many ways. As shown in FIGS. 1 and 2, in the present example, a extension parts 212 is extended out from both sides of the rotating block 210, a step 221 is provided on the fixing block 220, and the rotating block 210 is connected with the fixing block 220 by a flexible element 230. When the guiding assembly is in use, the fixing block 220 is rotated clockwise in relation to the flexible element 230 to a position that the rotating block 210 is substantially in parallel with the fixing block 220, with the step 221 abutting against the extension parts 212, the obstructing element 211 abutting against the opening 102, and the clamping element 201 engaging with the clamping position 103. The obstructing element 211 can prevent the rotating block 210 from excess rotating, i.e. rotating inward the channel, so as to form a stable guiding channel 300.

As shown in FIG. 1, the clamping base 100 of the present example comprises a base 110 and a housing 120, with a screw hole 111 and the opening 102 provided on the base 110, and the clamping slot 101 provided on the housing 120. The base 110 is provided with a guiding rail 112, and the housing 120 is provided with a sliding slot 121. When the sliding slot 121 slides into the guiding rail 112, the housing 120 is connected with the base 110 and covers the screw hole 111. To use this assembly, the base 110 can be fixed on the floor by a screw, and then the sliding slot 121 of the housing 120 can slide inside along the guiding rail 112 of the base 110. After mounting, the housing covers the screw hole 111 and prevents the screw from rusting.

When the present example is in use, a first panel of glass door can be fixed by the clamping slot 101 of the clamping base 100. In the meantime, the clamping base is provided with an opening 102 which is rotatably connected with a guiding block 200. As the clamping base is provided with a clamping position 103 and the guiding block 200 is provided with a clamping element 201, when the guiding block 200 rotates and forms a guiding channel 300 with the clamping base 100, the clamping element 201 can be engaged with the clamping position 103, allowing a movable panel of glass sliding through the guiding channel 300. When cleaning the bathroom, it is only necessary to push the clamping element 201 apart from the clamping position 103, which makes the guiding block 200 extensible and thus the glass can be taken out. Therefore the cleaning can be very easy, the operation and mounting is very convenient.

EXAMPLE 2

Figure 5:
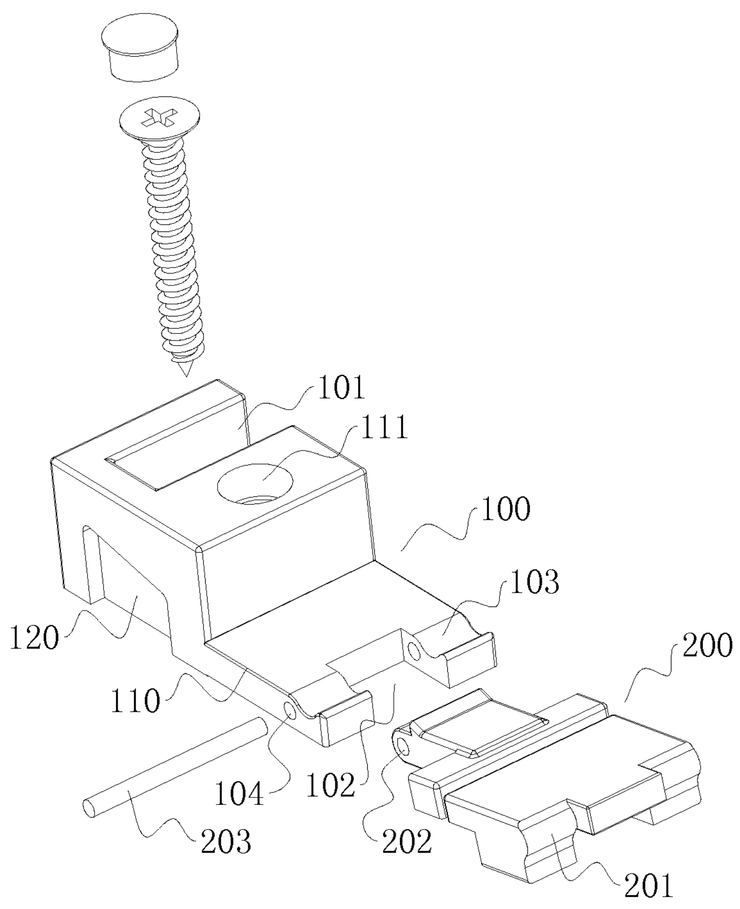
FIG. 5 is an exploded view of example 2 of the present invention.
Figure 6:
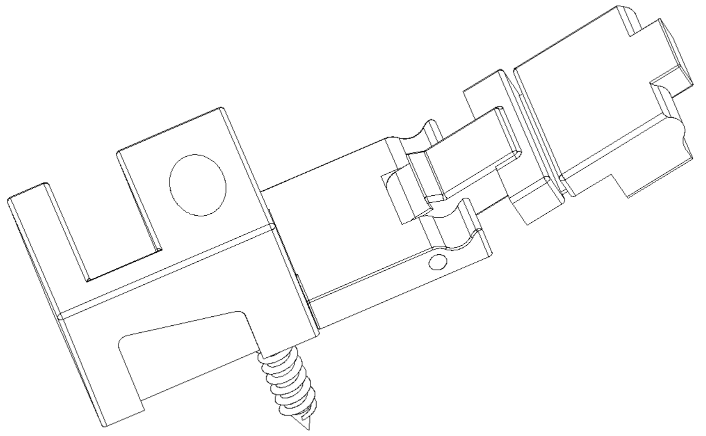
FIG. 6 is an assembly view of example 2.
Figure 7:
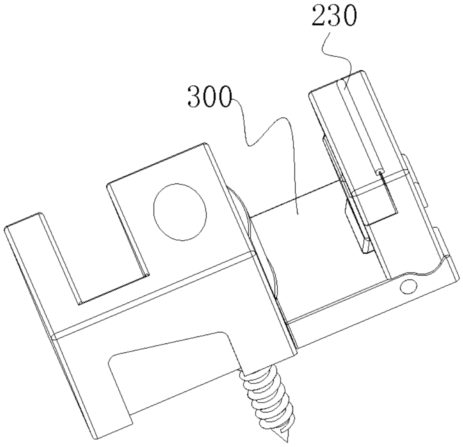
FIG. 7 is a using state view of example 2.

As shown in FIGS. 5 to 7, the present example is substantively equal to example 1 except that the base 110 is integrally formed with the housing 120. In this case, only a nut cap is needed for covering the screw.

EXAMPLE 3

Figure 8:
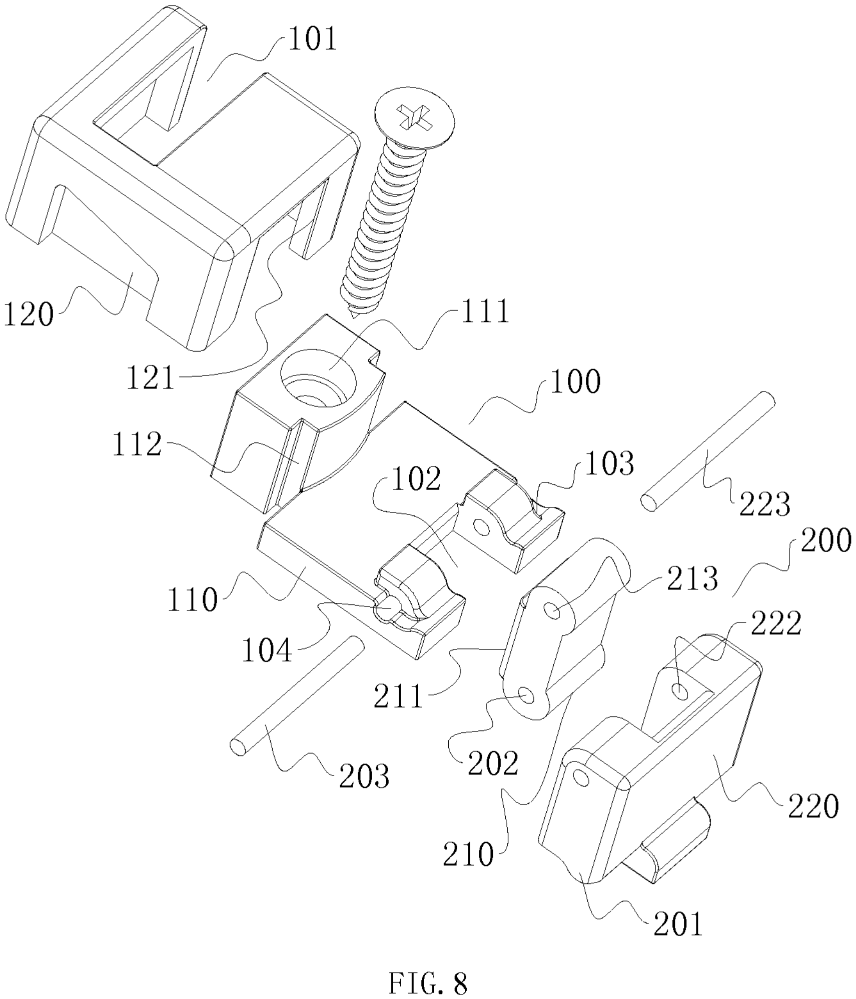
FIG. 8 is an exploded view of example 3 of the present invention.
Figure 9:
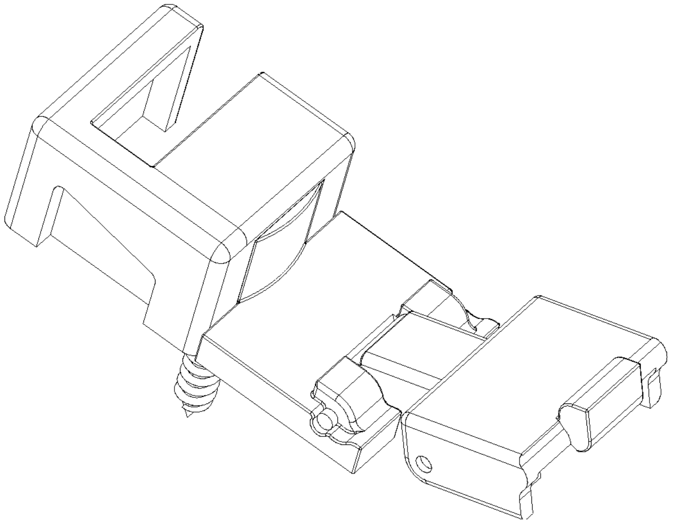
FIG. 9 is an assembly view of example 3.
Figure 10:
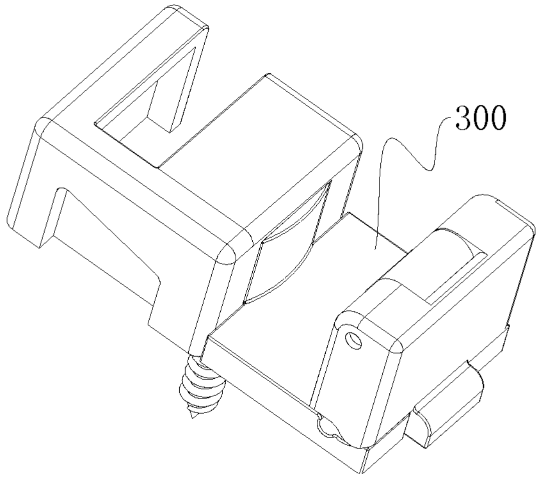
FIG. 10 is a using state view of example 3.

As shown in FIGS. 8 to 10, the present example is substantively equal to example 1 except that the rotating block 210 is connected with the fixing block 220 in a different way.

In the present example, second connecting pin holes 213 are provided on the rotating block 210, third connecting pin holes 222 are provided on the fixing block 220, and the fixing block 220 is rotatably connected with the rotating block 210 by a second pin 223 penetrating through the second connecting pin holes 213 and the third connecting pin holes 222. When the guiding assembly is in use, the rotating block 210 is overlapping connected with the fixing block 220, with the obstructing element 211 abutting against the clamping base, and the clamping element 201 abutting against the clamping position 103. Either way can be used, provided that the rotating block and the fixing block form a guiding block 200 stably retained on the clamping base 100, such that a guiding channel 300 can be formed for a movable glass to slide through.

It should be understood that various example embodiments have been described with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

What is claimed is:

1. An easy cleaning guiding assembly, comprising a clamping base (100) provided with an opening (102) and a clamping position (103), a guiding block (200) being rotatably connected with the clamping base (100) and provided with a clamping element (201), wherein when the guiding assembly is in use, the guiding block (200) is fixed on the clamping base (100) by engagement of the clamping element (201) in the clamping position (103), and a guiding channel (300) is formed by the guiding block (200) and the clamping base (100), pin holes (104) are provided on both sides of the clamping base (100), connecting pin holes (202) are provided on the guiding block (200), the guiding block (200) is rotatably connected with the clamping base (100) by a pin (203) penetrating through the pin holes (104) and the connecting pin holes (202), the guiding block (200) comprises a rotating block (210) and a fixing block (220) connected with the rotating block (210), the connecting pin holes (202) are provided on the rotating block (210) for rotatable connection of the rotating block and the clamping base (100), and the rotating block has an obstructing element (211) for preventing excess rotation of the rotating block, and the clamping element (201) is provided on the fixing block, and the fixing block is fixed by engagement of the clamping element in the clamping position of the clamping base the rotating block has extension parts (212) extended from both sides of the rotating block, a step (221) is provided on the fixing block, the rotating block is connected with the fixing block by a flexible element (230), and when the guiding assembly is in use, the rotating block is in parallel with the fixing block, with the step abutting against the extension parts, the obstructing element abutting against the opening, and the clamping element engaging in the clamping position.

2. The easy cleaning guiding assembly of claim 1, wherein the clamping base further comprises a screw hole (111) for fixing the clamping base onto floor, and a clamping slot (101).

3. The easy cleaning guiding assembly of claim 1, wherein the guiding assembly comprises a housing (120) having a clamping slot (101) and a compartment, wherein the clamping base is received within the compartment.

4. The easy cleaning guiding assembly of claim 1, wherein the clamping element and the clamping position are in smooth connection.

5. The easy cleaning guiding assembly of claim 1, wherein the clamping element has an arched contour and the clamping position has a concave smooth surface, for achieving smooth connection therebetween.

* * * * *